(12) United States Patent
Shinozaki et al.

(10) Patent No.: US 7,931,377 B2
(45) Date of Patent: Apr. 26, 2011

(54) SCREEN AND PROJECTION SYSTEM

(75) Inventors: Junichiro Shinozaki, Chino (JP);
Takashi Nagate, Shimosuwa-machi (JP); Seiichi Taniguchi, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 401 days.

(21) Appl. No.: 12/082,833

(22) Filed: Apr. 15, 2008

(65) Prior Publication Data

US 2009/0161074 A1    Jun. 25, 2009

(30) Foreign Application Priority Data

May 1, 2007   (JP) ................ 2007-120563

(51) Int. Cl.
*G03B 21/26* (2006.01)
*G03B 21/28* (2006.01)
*G03B 21/20* (2006.01)

(52) U.S. Cl. ........... 353/94; 353/31; 359/449; 359/456; 359/459

(58) Field of Classification Search ............ 353/28, 353/30, 79, 94; 359/449, 453, 454, 455, 359/456, 459, 460
See application file for complete search history.

(56) References Cited

U.S. PATENT DOCUMENTS

| 6,560,025 | B2 | 5/2003 | Tabata et al. |
| 6,829,086 | B1 * | 12/2004 | Gibilini .................. 359/453 |
| 6,999,232 | B2 * | 2/2006 | Peterson et al. ............ 359/460 |
| 7,061,676 | B2 * | 6/2006 | Kumagai et al. ............ 359/457 |
| 7,088,508 | B2 | 8/2006 | Ebina et al. |
| 2006/0232859 | A1 | 10/2006 | Ebina et al. |
| 2009/0002818 | A1 | 1/2009 | Iwabu et al. |

FOREIGN PATENT DOCUMENTS

| JP | 63-172259 A | 7/1988 |
| JP | 9-114003 A | 5/1997 |
| JP | 10-123623 A | 5/1998 |
| JP | 2001-108939 A | 4/2001 |
| JP | 2001-272727 A | 10/2001 |
| JP | 2003-004905 A | 1/2003 |
| JP | 2005-189470 A | 7/2005 |
| JP | 2005-292679 A | 10/2005 |
| JP | 2006-227581 A | 8/2006 |
| JP | 2006-285156 A | 10/2006 |
| JP | 2006-317941 A | 11/2006 |
| WO | WO-2005-010577 A | 2/2005 |

* cited by examiner

*Primary Examiner* — William C Dowling
(74) *Attorney, Agent, or Firm* — AdvantEdge Law Group, LLC (57) ABSTRACT

A screen including a first plane and a second plane opposite to the first plane, at least one of which is illuminated with light, includes a reflective portion that reflects the light incident on the first plane, a transmissive portion that transmits the light incident on the second plane toward the first plane, and an optical element that focuses the light incident on the second plane such that the focused light is incident on the transmissive portion.

16 Claims, 9 Drawing Sheets

SCREEN AND PROJECTION SYSTEM

BACKGROUND

1. Technical Field

The present invention relates to a screen and a projection system, and particularly to a technology of a screen used with a projector that projects light representing an image signal.

2. Related Art

A projector projects light representing an image signal and uses the light reflected off a screen or the like to display an observable image on the same side as the projector with respect to the screen. On the other hand, when the light representing an image signal passes through a screen or the like, an observable image can be displayed on the side opposite to the projector with respect to the screen. When a screen that can reflect and transmit light is used, a projector disposed on the viewer's side with respect to the screen and a projector disposed on the side opposite to the viewer with respect to the screen can be used for effective display. For example, JP-A-9-114003 and JP-A-2006-227581 propose technologies of screen that reflects and transmits light. JP-A-9-114003 proposes a configuration using a translucent film that reflects and transmits light. JP-A-2006-227581 proposes a configuration in which light having a specific polarization component is reflected whereas light having another polarization component is transmitted.

In the technology described in JP-A-9-114003, substantially half the projected light that is intended to be reflected off the screen passes through the translucent film, and substantially half the projected light that is intended to be transmitted through the screen is reflected off the translucent film. Therefore, approximately half the light that the projectors have projected is lost, so that sufficiently bright display is difficult to achieve. Further, since the light reflected off the diffuser layer and the light transmitted through the diffuser layer mostly diverge in the direction away from the projectors, likely resulting in a non-uniform light intensity distribution on the screen in which areas closer to the periphery of the screen are darker. In the technology described in JP-A-2006-227581, since the light from one projector is divided into two directions, sufficiently bright display is difficult to achieve, likely resulting in a non-uniform light intensity distribution as in JP-A-9-114003. Further, since the display on one side of the screen is reversed right and left from the display on the other side of the screen, the technology is not suitable for applications involving display of characters and the like, and hence only suitable for limited applications. As described above, both the technologies of related art encounter difficulty obtaining a bright image with a uniform light intensity distribution by reflecting and transmitting light.

SUMMARY

An advantage of some aspects of the invention is to provide a screen that reflects and transmits light to display a bright image with a uniform light intensity distribution, and a projection system using such a screen.

A screen according to a first aspect of the invention includes a first plane and a second plane opposite to the first plane, at least one of which is illuminated with light. The screen further includes a reflective portion that reflects the light incident on the first plane, a transmissive portion that transmits the light incident on the second plane toward the first plane, and an optical element that focuses the light incident on the second plane such that the focused light is incident on the transmissive portion.

The first plane is the surface of the screen that faces the viewer, and the second plane is the surface of the screen that is opposite to the viewer. By transmitting the light focused through the optical element on the second plane side from the transmissive portion toward the first plane, the light incident on the second plane can efficiently be outputted toward the first plane. The size of the transmissive portion can thus be small on the first plane side, so that the reflective portion can be large in size. A large reflective portion allows efficient reflection of the light incident on the first plane. Moreover, by employing a configuration in which the light incident on the second plane is refracted through the optical element, the light intensity distribution of the light incident on the second plane is made uniform. By thus reflecting and transmitting the light, a screen for displaying a bright image with a uniform light intensity distribution is provided.

It is preferable that the reflective portion is inclined to reflect the light incident on the first plane and direct the reflected light in a specific direction. Such a reflective portion can efficiently direct the light reflected off the reflective portion toward the viewer, and display an even brighter image with a uniform light intensity distribution.

It is preferable that the reflective portion has a shape substantially the same as part of a spheroid. In this case, it is preferable that one of the focal points of the spheroid is coincident with projection position of projector. Such a reflective portion can direct the light incident on the first plane in a specific direction.

It is preferable that the reflective portion scatters light. Such a reflective portion provides excellent viewing angle characteristics.

It is preferable that the optical element has a curved surface whose curvature radius is substantially the same as R that satisfies the following equation: $R=(n-1)t/n$, where $t$ represents the distance between the first plane and the second plane, and $n$ represents the refractive index of the material that forms the optical element.

In this way, the light passing through the optical element can be focused in the vicinity of the transmissive portion, and the light passing through the optical element can efficiently be transmitted toward the first plane. The size of the transmissive portion can thus be small, so that the reflective portion can be large in size and hence the light incident on the first plane can be efficiently reflected.

It is preferable that the optical element has a curved surface whose curvature in the horizontal direction is greater than the curvature in the vertical direction, which is substantially perpendicular to the horizontal direction. Further, the transmissive portion is desirably longer in the horizontal direction than in the vertical direction. In general, the viewer observes an image at a wider angle in the horizontal direction than in the vertical direction. By diffusing the light at a wider angle in the horizontal direction than in the vertical direction, it is possible to efficiently direct the light over a predetermined range and provide an even brighter image.

It is preferable that the screen further includes an angular conversion portion that angularly converts the light incident on the second plane. Such an angular conversion portion provides an image with a more uniform light intensity distribution.

It is preferable that the transmissive portion scatters light. Such a transmissive portion provides excellent viewing angle characteristics.

It is preferable that the screen further includes a diffusing portion that diffuses the light that has passed through the transmissive portion in a first direction parallel to the first plane or in the first direction and a second direction parallel to the first plane and substantially perpendicular to the first direction. The first direction is, for example, the horizontal direction, and the second direction is, for example, the vertical direction. By diffusing light in the first direction, it is possible to efficiently direct the light over a predetermined range and provide a bright image. By diffusing the light in the horizontal direction, it is possible to reduce variation in brightness in a wide horizontal range and provide a bright image.

It is preferable that the screen further includes a reflection reducing portion that reduces the reflection of the light incident on the second plane. The reflection reducing portion can reduce the loss of the light incident on the second plane, generation of stray light that leads to blurring, and degradation in contrast. Further, successively disposing such reflection reducing portions across the second plane can provide sufficient strength of the screen. The reflection reducing portion also serves to reduce warpage and deformation of the screen.

It is preferable that the reflection reducing portion is disposed on the optical element. Such a reflection reducing portion can reduce the loss of the light incident on the optical element caused by the reflection on the surface of the optical element. By efficiently transmitting the light incident on the optical element toward the first plane, a bright image with high contrast is provided.

It is preferable that the reflection reducing portion includes an absorbing portion that absorbs light, and the absorbing portion is disposed on the second plane side of the reflective portion. The absorbing portion can reduce the reflection of the light incident on the second plane and provide an image with a small amount of blurring due to stray light but with high contrast.

It is preferable that the absorbing portion is formed on the first plane side of the optical element. The entire light incident on the second plane thus enters the optical element. This configuration reduces the loss of the light incident on the second plane, part of which otherwise directly enters the absorbing portion.

A projection system according to a second aspect of the invention includes the screen described above, a first projector that projects light onto the first plane of the screen, and a second projector that projects light onto the second plane of the screen that is opposite to the first plane. By using the screen described above and reflecting and transmitting the light, a bright image with a uniform light intensity distribution can be displayed. A projection system capable of displaying a bright image with a uniform light intensity distribution is thus provided by reflecting and transmitting the light.

It is preferable that at least one of the first projector and the second projector is provided in multiple numbers. In such a configuration, an even brighter image can be displayed by superimposing the light beams from a plurality of projectors, and effective representation is also possible.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Embodiments of the invention will be described below in detail with reference to the drawings.

Figure 1:
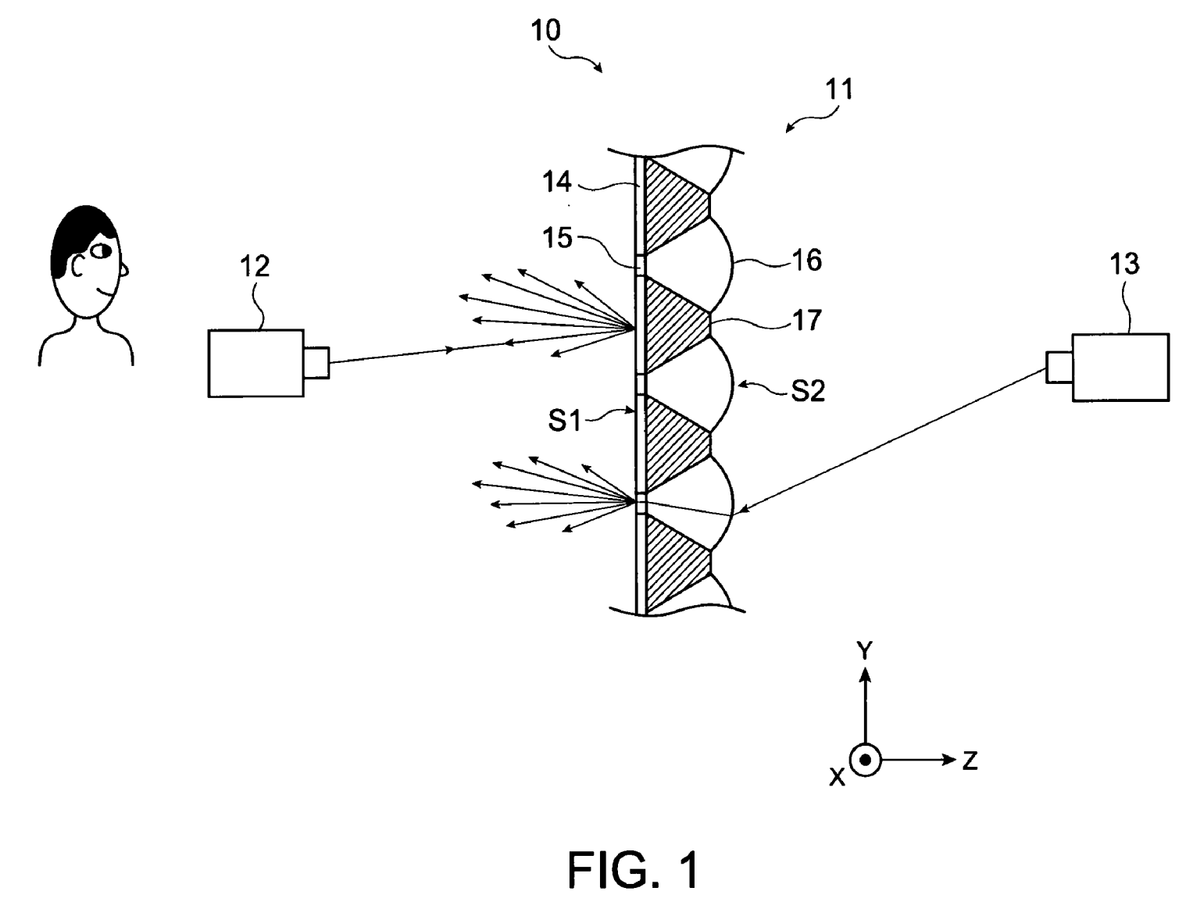
FIG. 1 shows a schematic configuration of the projection system according to an embodiment of the invention.

FIG. 1 shows a schematic configuration of the projection system 10 according to an embodiment of the invention. The projection system 10 includes a screen 11, a first projector 12, and a second projector 13. In FIG. 1, the screen 11 is shown in the form of the cross-sectional configuration of the key portion. The first projector 12 projects light representing an image signal onto a first plane S1 of the screen 11. The second projector 13 projects light representing an image signal onto a second plane S2 of the screen 11. The first plane S1 is the plane of the screen 11 that faces the viewer. The second plane S2 is the plane of the screen 11 that is opposite to the first plane S1. The screen 11 is disposed along the X direction and the Y direction substantially perpendicular to the X direction. The Z direction is substantially perpendicular to the X and Y directions.

Figure 2:
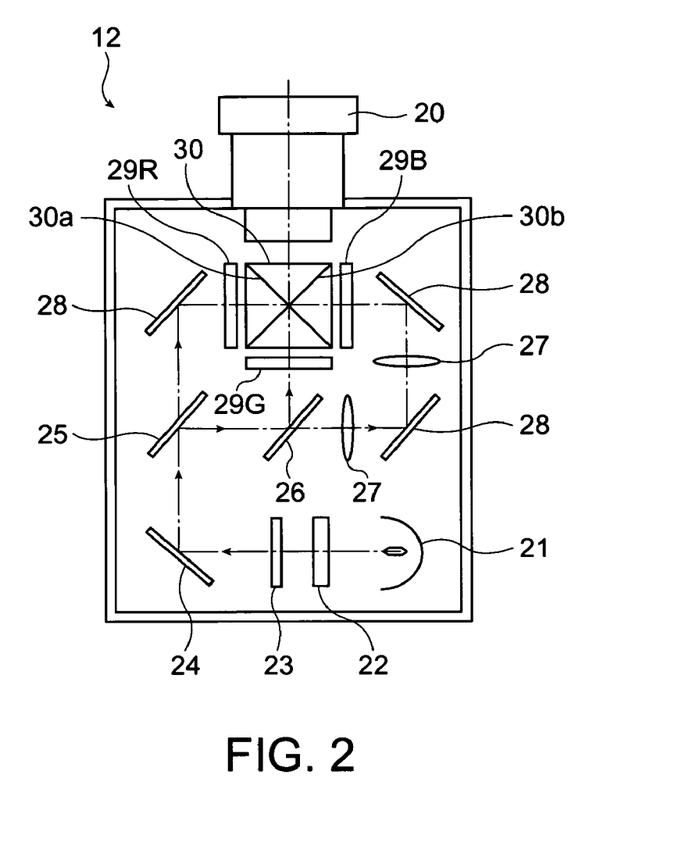
FIG. 2 shows a schematic configuration of a first projector.

FIG. 2 shows a schematic configuration of the first projector 12. An ultrahigh-pressure mercury lamp 21, which is a light source, supplies light containing red (R) light, green (G) light, and blue (B) light. An optical integrator 22 makes the illuminance distribution of the light from the ultrahigh-pressure mercury lamp 21 substantially uniform. A polarization conversion element 23 converts the light with a uniform illuminance distribution into, for example, p-polarized light.

The converted p-polarized light is reflected off a reflection mirror 24, so that the light path is bent and the reflected light is in incident on a first dichroic mirror 25. The first dichroic mirror 25 transmits the R light and reflects the G light and the B light. The R light that has passed through the first dichroic mirror 25 is reflected off a reflection mirror 28, so that the light path is bend and the reflected R light is incident on a spatial light modulator for R light 29R. The spatial light modulator for R light 29R modulates the R light according to an image signal. Specifically, the spatial light modulator for R light 29R is a transmissive liquid crystal display device. The spatial light modulator for R light 29R converts part of the p-polarized light into s-polarized light according to the image signal. In the spatial light modulator for R light 29R, a polarizer plate (not shown) provided on the backside of the liquid crystal panel transmits only the s-polarized light and outputs image light, the intensity of which is modulated according to the image signal. The R light modulated by the spatial light modulator for R light 29R is incident on a cross dichroic prism 30, which is a light combing system. An example of the transmissive liquid crystal display device may be a high temperature polysilicon (HTPS) TFT liquid crystal panel.

The G light and the B light are reflected off the first dichroic mirror 25, so that the light paths are bent and the reflected G light and B light are incident on a second dichroic mirror 26. The second dichroic mirror 26 reflects the G light and transmits the B light. The G light reflected off the second dichroic mirror 26 is incident on a spatial light modulator for G light 29G. The spatial light modulator for G light 29G modulates the G light according to an image signal. Specifically, the spatial light modulator for G light 29G is a transmissive liquid crystal display device. The spatial light modulator for G light 29G converts part of the p-polarized light into s-polarized light according to the image signal. In the spatial light modulator for G light 29G, a polarizer plate (not shown) provided on the backside of the liquid crystal panel transmits only the s-polarized light and outputs image light, the intensity of which is modulated according to the image signal. The G light modulated by the spatial light modulator for G light 29G is incident on a side of the cross dichroic prism 30 that is different from the side on which the R light is incident.

The B light that has passed through the second dichroic mirror 26 is incident on a spatial light modulator for B light 29B via two relay lenses 27 and two reflection mirrors 28. The light path of the B light is longer than those of the R light and the G light. A relay optical system using the relay lenses 27 is incorporated in the light path of the B light in order to make the illumination magnification at the spatial light modulator for the B light identical to those for the R light and the G light. The spatial light modulator for B light 29B modulates the B light according to an image signal. Specifically, the spatial light modulator for B light 29B is a transmissive liquid crystal display device. The spatial light modulator for B light 29B converts part of the p-polarized light into s-polarized light according to the image signal. In the spatial light modulator for B light 29B, a polarizer plate (not shown) provided on the backside of the liquid crystal panel transmits only the s-polarized light and outputs image light, the intensity of which is modulated according to the image signal. The B light modulated by the spatial light modulator for B light 29B is incident on a side of the cross dichroic prism 30 that is different from the sides on which the R light and the G light are incident.

The cross dichroic prism 30 has two dichroic films 30a and 30b disposed substantially perpendicular to each other. The first dichroic film 30a reflects the B light and transmits the R and G light. The second dichroic film 30b reflects the R light and transmits the G and B light. The cross dichroic prism 30 outputs the R, G, and B light incident from different sides. A projection lens 20 projects the s-polarized light, which oscillates in a specific direction, combined in the cross dichroic prism 30. The second projector 13 is configured in the same manner as the first projector 12.

Referring back to FIG. 1, a reflective portion 14 is provided in the first plane S1 of the screen 11. The reflective portion 14 reflects the light incident on the first plane S1 of the screen 11. The reflective portion 14 can be made of a highly reflective material, for example, a metallic material. The surface of the reflective portion 14 has minute irregularities. The reflective portion 14 not only reflects light but also scatters light. Transmissive portions 15 are formed in the portions of the second plane S2 where no reflective portion 14 is formed. Each of the transmissive portions 15 transmits the light incident on the second plane S2 toward the first plane S1. The transmissive portion 15 is made of a transparent material. The transmissive portion 15 has light-scattering material dispersed therein. The transmissive portion 15 not only transmits light but also scatters light. The transmissive portion 15 may have a scattering surface having minute irregularities instead of having scattering material dispersed therein.

Microlenses 16 are provided in the second plane S2 of the screen 11. A plurality of microlenses 16 are arranged in an array in the second plane S2. Each of the microlenses 16 focuses the light incident on the second plane S2 such that the focused light is incident on the transmissive portion 15. The microlens 16 is made of transparent material.

Absorbing portions 17 are provided on the second plane S2 side of the reflective portion 14 and between microlenses 16. Each of the absorbing portions 17 absorbs light. The absorbing portion 17 serves as a reflection reducing portion that reduces the reflection of the light incident on the second plane S2. In particular, the absorbing portion 17 reduces the reflection of the light traveling from the second plane S2 toward the reflective portion 14. The absorbing portion 17 has a trapezoidal cross-sectional shape. The absorbing portion 17 can be made of, for example, a light-absorbing resin. The provision of the absorbing portions 17 can reduce generation of stray light that leads to blurring, and hence reduce degradation in contrast. Further, successively disposing the absorbing portions 17 across the second plane S2 provides sufficient strength of the screen 10. The absorbing portions 17 also serve to reduce warpage and deformation of the screen 10 and maintain the flatness thereof.

Figure 3:
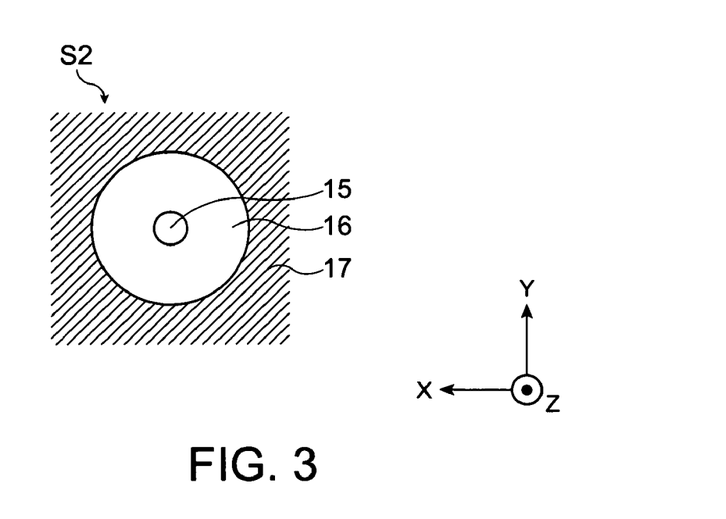
FIG. 3 shows the XY-plane structure of the portion of a second plane in which a microlens is provided.

FIG. 3 shows the XY-plane structure of the portion in which the microlens 16 is formed when viewed from the second plane S2 side. The microlens 16 and the transmissive portion 15 are disposed in such a way that the centers thereof substantially coincide with each other. The transmissive portions 15 are arranged in an array in the first plane S1 at the same intervals as the microlenses 16. Referring back to FIG. 1, the microlens 16 is disposed in a substantially truncated cone-shaped hole surrounded by absorbing portions 17. The hole has a shape obtained by cutting a cone with a plane perpendicular to the central axis of the cone and removing the portion containing the apex of the cone. The microlens 16 has a shape obtained by cutting off part of a sphere so that it fits in the substantially truncated cone-shaped hole. The screen 11 may include a transparent substrate added to the configuration described in this embodiment.

The light coming from the first projector 12 and incident on the reflective portion 14 is reflected off the reflective portion 14 and travels toward the viewer. The reflective portion 14 not only reflects the light but also scatters the light on the viewer's side. The light coming from the second projector 13 is incident on the microlenses 16, each of which focuses the light and directs it toward the transmissive portion 15. The light incident on the transmissive portion 15 passes therethrough and travels toward the viewer. The transmissive portion 15 not only transmits the light but also scatters the light on the viewer's side. Since the light is scattered by the reflective portion 14 and the transmissive portions 15, excellent viewing angle characteristics are provided.

Now, let t be the thickness of the screen 11, and n be the refractive index of the material that forms the microlens 16. The microlens 16 desirably has a curved surface whose curvature radius is substantially the same as R that satisfies the following equation: $R=(n-1)t/n$. The thickness of the screen 11 is the distance between the first plane S1 and the second plane S2.

For example, when the thickness t of the screen 11 is 2 mm, and the refractive index n of the material that forms the microlens 16, for example, an acrylic resin, is 1.49, R is approximately 0.65 mm. The microlens 16 can thus be configured to have a curved surface whose curvature radius is approximately 0.65 mm.

Use of the microlens 16 having a curved surface whose curvature radius is substantially the same as R allows the light passing through the microlens 16 to be focused in the vicinity of the transmissive portion 15. The light passing through the microlens 16 can therefore efficiently be transmitted toward the first plane S1. The size of the transmissive portion 15 can thus be small, so that the reflective portion 14 can be large in size. A large reflective portion 14 allows efficient reflection of the light incident on the first plane S1.

Since the light focused through the microlens 16 on the second plane S2 side passes through the transmissive portion 15 toward the first plane S1, the light incident on the second plane S2 can efficiently be outputted toward the first plane S1. Further, providing the reflective portion 14 having a large area allows efficient reflection of the light incident on the first plane S1. Moreover, by employing the configuration in which the light incident on the second plane S2 is refracted through the microlenses 16, most of the light that is incident on the second plane S2 and transmitted and focused through the microlenses 16 passes through the screen. Therefore, the light is efficiently used to provide a bright image, and the light intensity distribution is made uniform. By thus reflecting and transmitting the light, a bright image with a uniform light intensity distribution can be displayed in an advantageous manner. The screen 11 may have scattering films formed on the reflective portion 14 and the transmissive portions 15. The scattering films scatter the light that has been reflected off the reflective portion 14 and the light that has passed through the transmissive portions 15 on the viewer's side. In this way, even more excellent viewing angle characteristics are provided.

Figure 4:
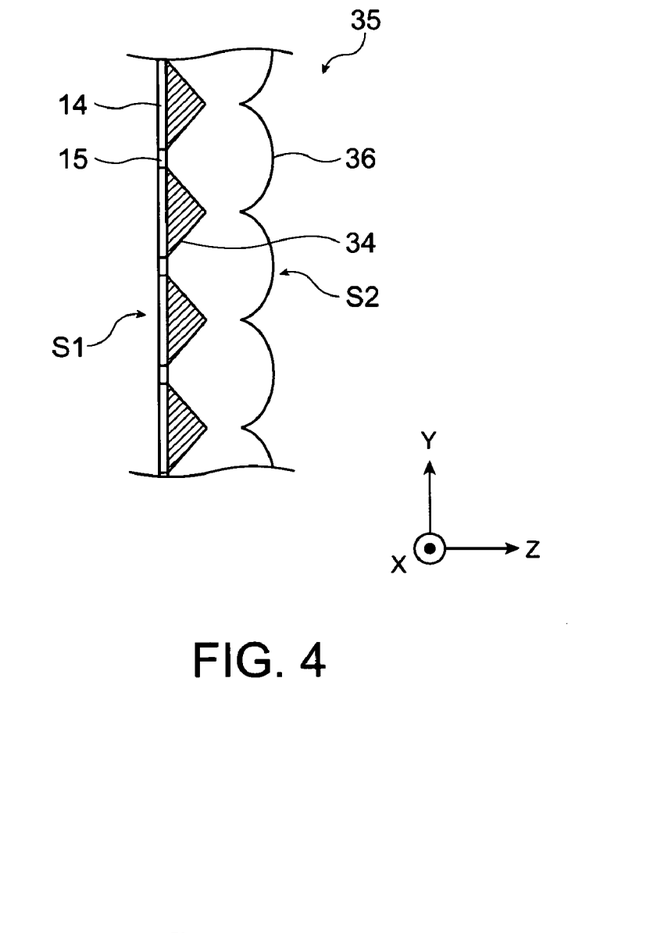
FIG. 4 shows the cross-sectional configuration of the key portion of the screen according to a first variation of the embodiment.

FIG. 4 shows the cross-sectional configuration of the key portion of the screen 35 according to a first variation of this embodiment. The screen 35 of this variation includes microlenses 36 disposed in the second plane S2 in a closely packed manner. Absorbing portions 34 are formed on the first plane S1 side of the microlenses 36. Each of the absorbing portions 34 has a triangular cross-sectional shape. The entire light incident on the second plane S2 thus enters the microlenses 36. This configuration reduces the loss of the light incident on the second plane S2, part of which otherwise directly enters the absorbing portions 34.

Figure 5:
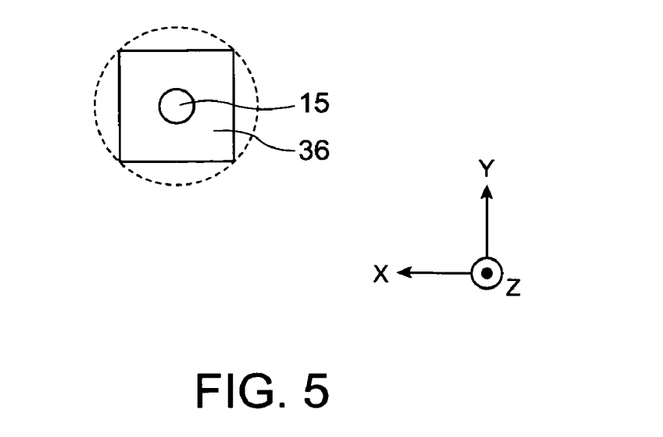
FIG. 5 shows the XY-plane configuration of a microlens.
Figure 6:
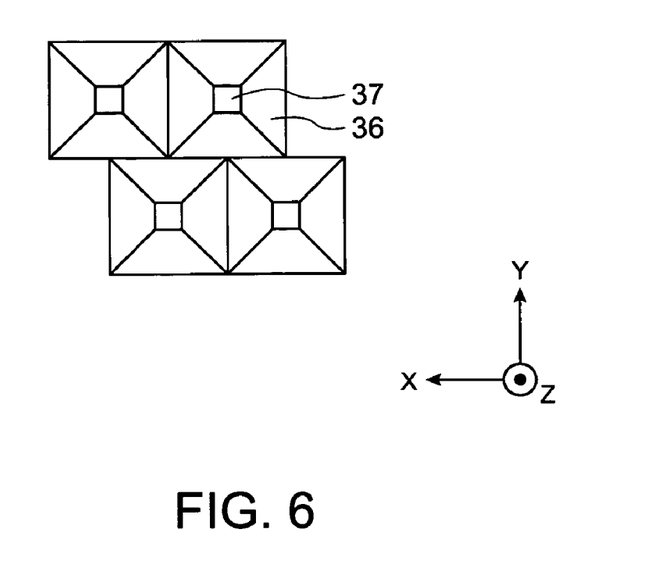
FIG. 6 shows a variation of a transmissive portion.
Figure 7:
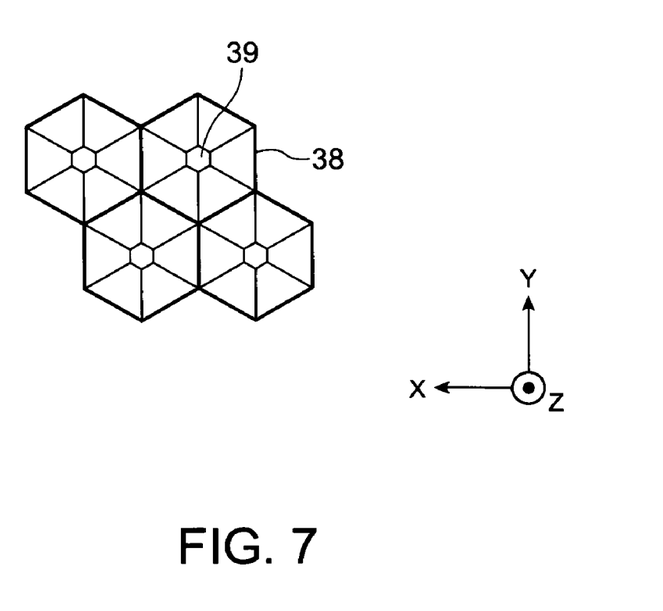
FIG. 7 shows a variation of the microlens and the transmissive portion.

FIG. 5 shows the XY-plane configuration of the microlens 36 viewed from the second plane S2 side. The microlenses 36, each shaped into a rectangular shape in the XY plane by cutting a microlens having the same shape as that of the microlens 16 shown in FIG. 3, can be disposed in the XY plane in a closely packed manner. The shapes of the microlens and the transmissive portion may be other shapes as appropriate. For example, as shown in FIG. 6, rectangular transmissive portions 37, each of which is substantially similar to the shape of the microlens 36, may be used. Alternatively, as shown in FIG. 7, microlenses 38, each cut and shaped into a truncated hexagonal pyramid, may be used. Each transmissive portion 39 can be shaped into a hexagon substantially similar to the cross-sectional shape of the microlens 38 obtained by cutting it with a plane perpendicular to the center line of the truncated hexagonal pyramid. Rectangular or hexagonal microlenses may be disposed in a honeycomb arrangement. The shapes of the microlenses and the transmissive portion are not limited to be circular, rectangular, and hexagonal, but can be other shapes as appropriate, for example, ellipsoidal, triangular, and octagonal. The transmissive portion may be more elongated in the horizontal direction than in the vertical direction. The microlenses may be disposed in a grid or honeycomb arrangement, and the transmissive portions can be disposed in a grid or staggered arrangement in correspondence to the microlenses.

Referring back to FIG. 4, the screen 35 of this variation can be manufactured in a process of bonding two layers that have been formed in advance, that is, a layer of the microlenses 36 and a layer of the transmissive portions 34. To form the layer of the microlenses 36 and the layer of the transmissive portions 34, injection molding using dual molding may be used, which allows the layer of the microlenses 36 and the layer of the transmissive portions 34 to be easily formed.

Figure 8:
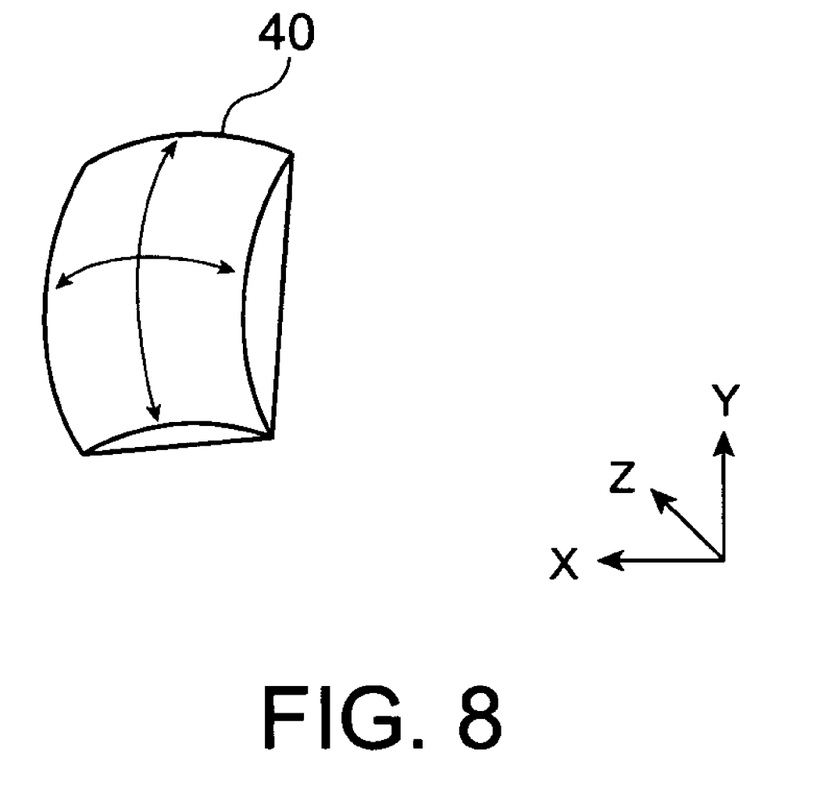
FIG. 8 shows a variation of the microlens.

The microlens does not necessarily have a spherical curved surface, but may have an aspherical curved surface. For example, a microlens 40 shown in FIG. 8 has two curvatures in the X and Y directions, and the curvature in the X direction is greater than that in the Y direction. The X direction is a first direction parallel to the first plane S1 and the second plane S2. Specifically, the X direction is the horizontal direction. The Y direction is a second direction parallel to the first plane S1 and the second plane S2 and substantially perpendicular to the first direction. Specifically, the Y direction is the vertical direction. The microlens 40 diffuses light at a wider angle in the X direction than in the Y direction. In general, the viewer observes an image at a wider angle in the horizontal direction than in the vertical direction. By diffusing light at a wider angle in the X direction than in the Y direction, it is possible to efficiently direct the light over a predetermined range and provide a bright image. By diffusing the light in the horizontal direction, it is possible to reduce variation in brightness in a wide horizontal range and provide a bright image. The microlens may have any other aspherical shape, such as a parabolic surface.

Figure 9A:
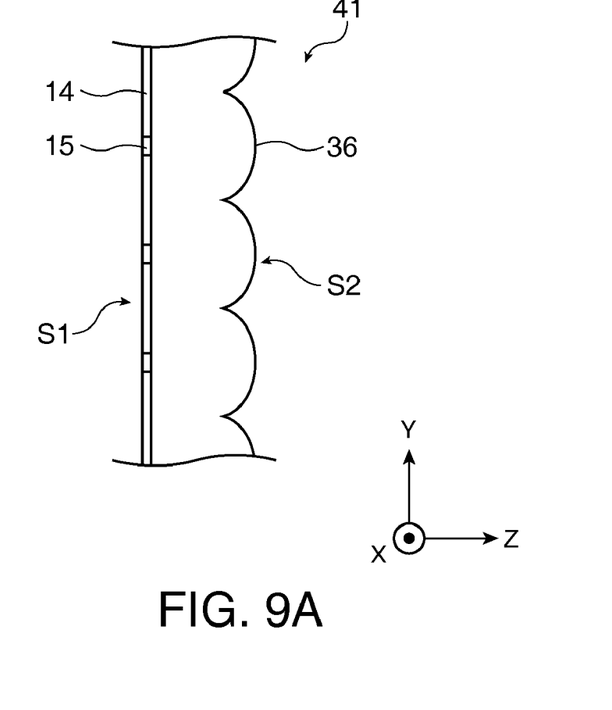
FIG. 9A shows a configuration in which an absorbing portion is omitted.

In this variation, each of the absorbing portions does not necessarily have the triangular cross-sectional shape. The absorbing portion may have any other shape, such as a flat plate shape. The absorbing portions may be replaced with a light absorbing film formed by applying a black paint or the like on the second plane S2 side of the reflective portion 14. In this way, the absorbing portions can be easily formed. Further, the absorbing portions may be omitted, like a screen 41 shown in FIG. 9A. In this way, the number of parts that form the screen 41 can be reduced. Further, when the formation of the absorbing portions is not necessary, the screen 41 can be easily manufactured.

Figure 9B:
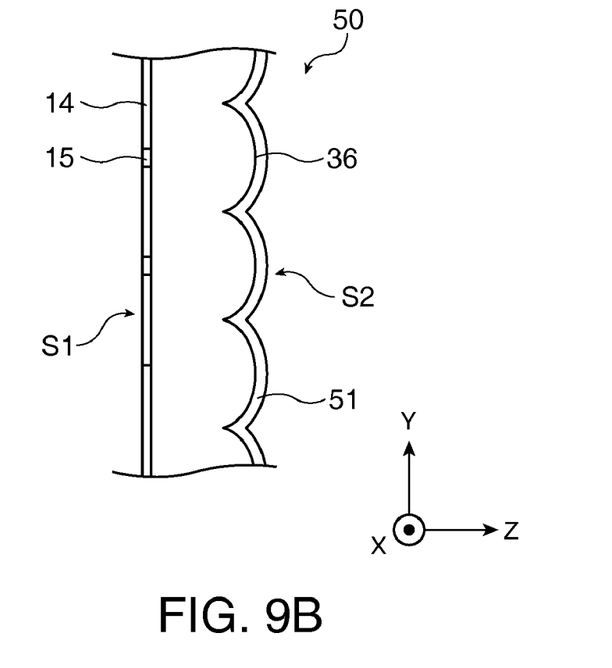
FIG. 9B shows the cross-sectional configuration of the key portion of a screen having an AR film.

FIG. 9B shows the cross-sectional configuration of the key portion of a screen 50 having an anti-reflective (AR) film 51. The screen 50 is similar to the screen 41 shown in FIG. 9A but the AR film 51 is added thereto. The AR film 51 is a reflection reducing section provided on the microlenses 36, and reduces the reflection of the light incident on the microlenses 36. The AR film 51 is, for example, a dielectric film formed of a single layer or multiple layers, and transmits light at a transmittance of, for example, 98% or higher. The provision of the AR film 51 can reduce the loss of the light incident on the microlenses 36 caused by the reflection on the surfaces of the microlenses 36. By efficiently transmitting the light incident on the microlenses 36 toward the first plane S1, a bright image with high contrast is provided. The AR film 51 may be applied to any of the screens described in this embodiment.

Figure 10:
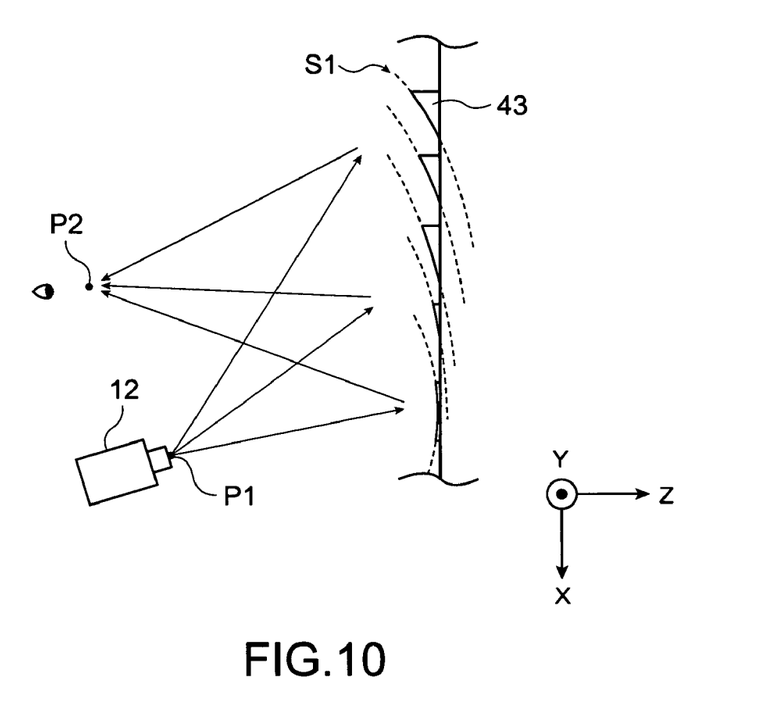
FIG. 10 shows the feature of the screen according to a second variation of the embodiment.

FIG. 10 shows the cross-sectional configuration of the key portion of reflective portions 43, which is the feature of the screen according to a second variation of this embodiment. The screen of this variation is characterized in that it has reflective portions 43, each inclined to direct the light incident on the first plane S1 in a specific direction. As shown in the XY-plane configuration in FIG. 11, each of the reflective portions 43 is shaped into a minute rectangle. A plurality of reflective portions 43 are arranged in an array. Each of the reflective portions 43 is inclined to direct the light from the first projector 12 in a specific direction. Transmissive portions (not shown) are provided in such a way that each of them is disposed between reflective portions 43. The transmissive portions can be disposed at arbitrary positions between reflective portions 43 at arbitrary intervals. The transmissive portion can be disposed in the portion along a side of the rectangular shape of the reflective portion 43, for example, in the vicinity of a corner of the rectangular shape or in the vicinity of the center of a side of the rectangular shape.

Figure 11:
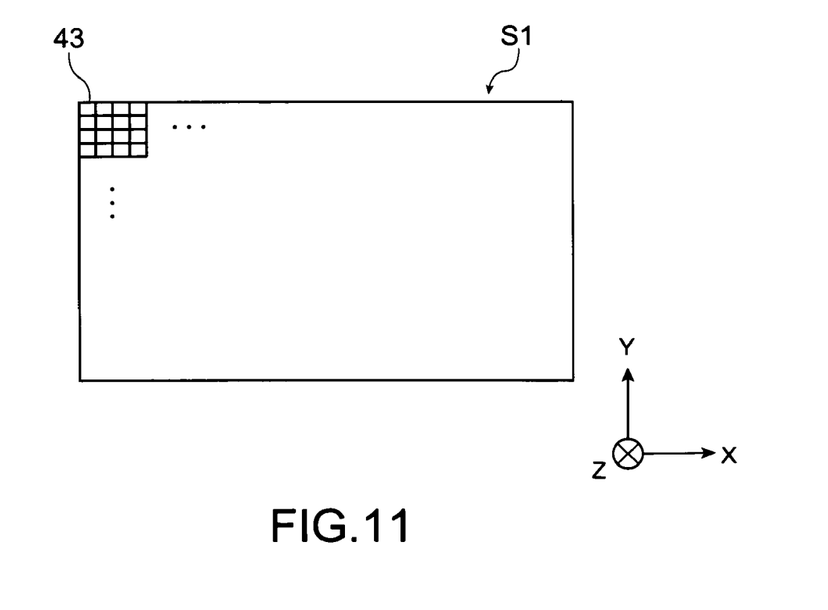
FIG. 11 explains the configuration of reflective portions.

The reflective portion 43 has substantially the same shape as part of a spheroid. One of the focal points of the spheroid is coincident with a projection position P1 of the first projector 12. The spheroid used herein corresponds to the surface of the three-dimensional object obtained by rotating an ellipse around its major axis. The other focal point of the spheroid is a point in the space on the first plane S1 side of the screen where the viewer is assumed to be present. Such a point is ideally, for example, a position roughly corresponding to the center of the screen. The first projector 12 does not necessarily project light from the same position in the X direction as that of the viewer, but may project light from a position different from that of the viewer. In this variation, the spheroid can be determined as appropriate according to the position where the viewer is assumed to be present and the position of the first projector 12. The reflective portions 43 can thus be disposed in an optimally shaped array according to the position where the viewer is assumed to be present and the position of the first projector 12.

By using the reflective portions 43, each having substantially the same shape as part of a spheroid, the light from the first projector 12 travels toward a position corresponding to the center of the screen via each of the reflective portions 43. Therefore, the light can efficiently be directed toward the viewer who is located in the vicinity of a position corresponding to the center of the screen. In this way, an even brighter image having a uniform light intensity distribution can be displayed. The reflective portions 43 are not necessarily configured to direct the light toward a position corresponding to the center of the screen, but can be configured in an appropriate manner according to the layout of the first projector 12 and the screen. The reflective portion may have substantially the same shape as part of a sphere or a microfacet corresponding to a plane tangential to a spheroid or a sphere. Such a microfacet can be used as an approximate spheroid or sphere.

Figure 12:
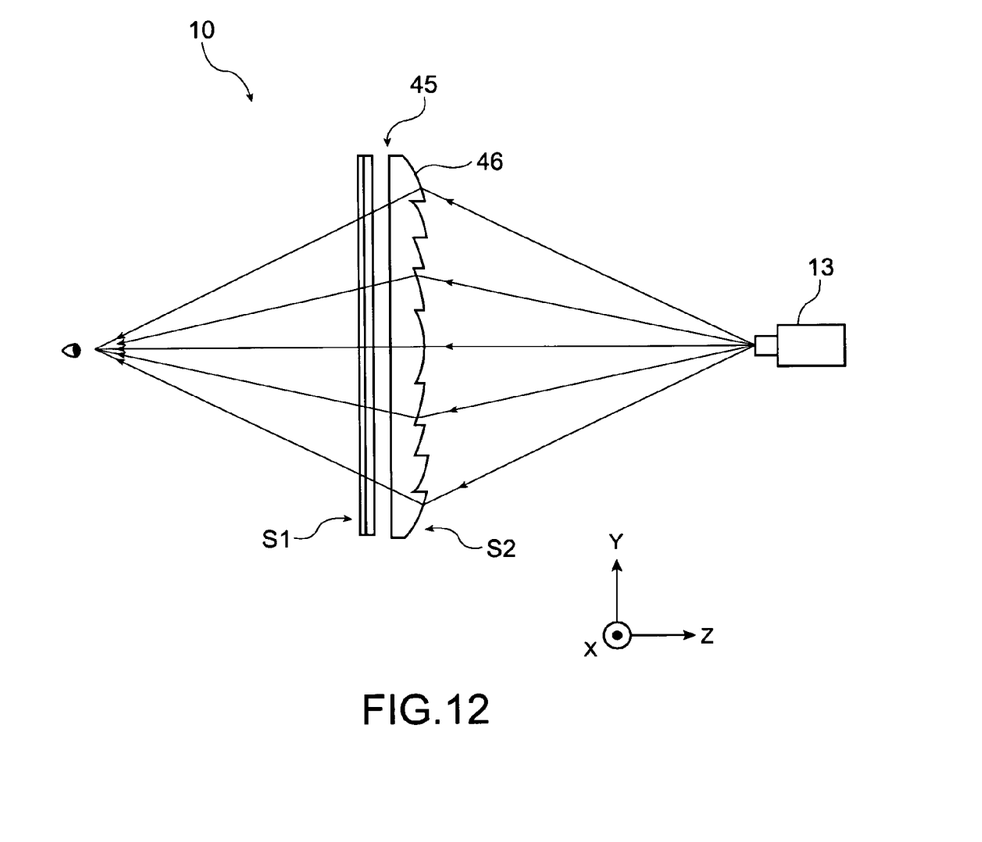
FIG. 12 explains the screen according to a third variation of the embodiment.

FIG. 12 explains the screen 45 according to a third variation of this embodiment. The screen 45 of this variation is characterized in that it has a Fresnel lens 46. The Fresnel lens 46 is provided in the second plane S2 of the screen 45. The Fresnel lens 46 is an optical element, an angle converter, for angularly converting the light incident on the second plane S2. The Fresnel lens 46 is made of a transparent material, such as a transparent resin.

The Fresnel lens 46 is formed by arranging annular prisms in the second plane S2, each of the prisms obtained by cutting the convex portion of a convex lens. The light from the second projector 13 is angularly converted when it is refracted through the Fresnel lens 46. The light that has undergone the angular conversion in the Fresnel lens 46 and passed through the screen 45 travels toward a point where the viewer is assumed to be present, ideally, for example, a position roughly corresponding to the center of the screen 45. Therefore, the light can efficiently be directed toward the viewer who is located in the vicinity of a position corresponding to the center of the screen 45. In this way, an even brighter image having a uniform light intensity distribution can be displayed. The Fresnel lens 46 is not necessarily configured to direct the light toward a position corresponding to the center of the screen 45, but can be configured in an appropriate manner according to the layout of the second projector 13 and the screen 45. The Fresnel lens 46 may be shaped into a grid array as in the case of the reflective portions 43 described above (see FIG. 11).

Figure 13:
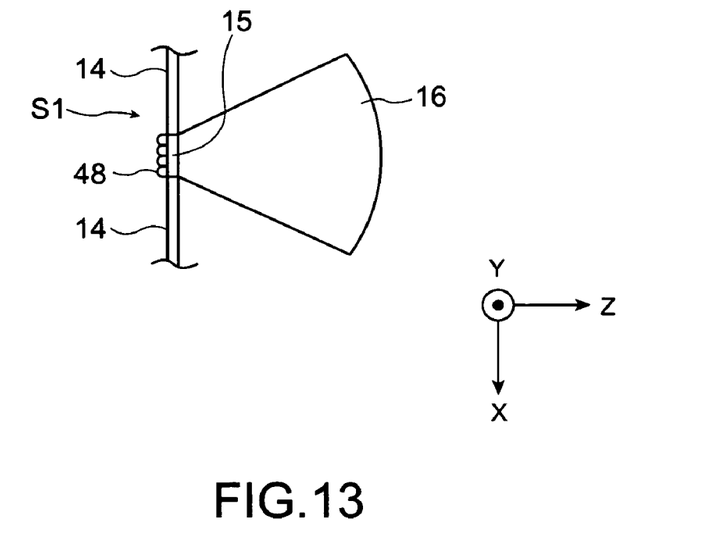
FIG. 13 shows the feature of the screen according to a fourth variation of the embodiment.
Figure 14:
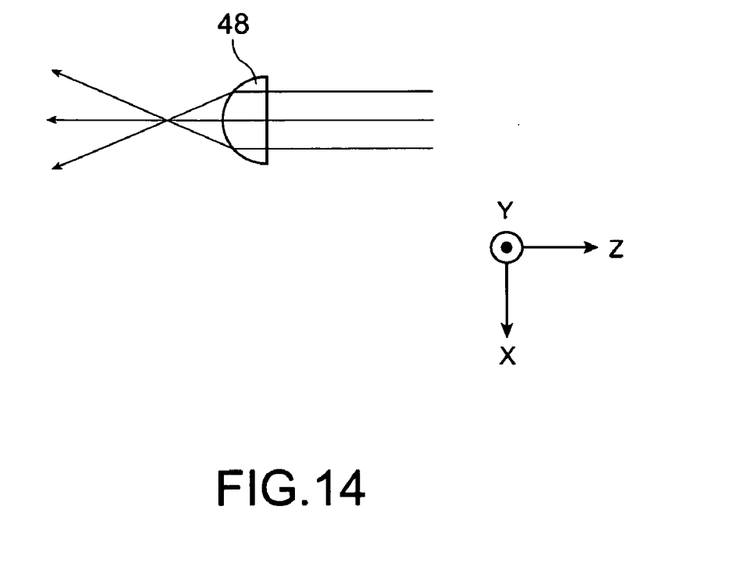
FIG. 14 explains how a lenticular lens diffuses light.

FIG. 13 shows the cross-sectional configuration of the key portion of a lenticular lens 48 and therearound, which is the feature of the screen according to a fourth variation of this embodiment. The lenticular lens 48 is provided on the end surface of the transmissive portion 15, through which the light from the second plane S2 exits. The lenticular lens 48 is a diffusing portion that diffuses the light that has passed through the transmissive portion 15. The lenticular lens 48 has a curved surface having a curvature in the X direction but not in the Y direction. The curved surface of the lenticular lens 48 is substantially flat in the Y direction. A plurality of components that form the lenticular lens 48 are arranged in the X direction on the first plane S1 side of the transmissive portion 15. As shown in FIG. 14, the lenticular lens 48 refracts and hence diffuses the light incident on the lenticular lens 48. The X direction is a first direction parallel to the first plane S1. Specifically, the X direction is the horizontal direction. The Y direction is a second direction parallel to the first plane S1 and substantially perpendicular to the first direction.

The use of the lenticular lens 48 allows the light to be diffused at a wider angle in the X direction than in the Y direction. It is thus possible to efficiently direct the light over a predetermined range and provide an even brighter image. The diffusing portion is not limited to the lenticular lens 48, but may be any other optical element as long as it diffuses light at least in the first direction. A microlens capable of diffusing light in the X and Y directions may be used as the diffusing portion. Such a microlens may have an elongated shape in which the curvature is greater in the X direction than in the Y direction as in the microlens 40 shown in FIG. 8. An example of such a shape may be the one similar to part of a rugby ball. In this way, the light can be diffused in the Y direction as well.

The second projector 13 may project the light diagonally to the screen. The light incident diagonal to the screen can be angularly converted as appropriate, for example, by using an optical element including a prism. By employing a configuration in which the light from the second projector 13 is incident diagonally, the second projector 13 can be disposed at a position closer to the screen. In this way, a necessary space on the opposite side of the screen to the viewer can be smaller.

The first and second projectors 12 and 13 are not limited to those using an ultrahigh-pressure mercury lamp as the light source. For example, a solid-state light source, such as an LED, or a laser light source may be used. Further, the first and second projectors 12 and 13 are not limited to those using a transmissive liquid crystal display device. Instead of a transmissive liquid crystal display device, examples of the spatial light modulator may include a liquid crystal on silicon (LCOS) device, a DMD (Digital Micromirror Device), and a GLV (Grating Light Valve).

The projection system 10 may be configured in such a way that the first and second projectors 12 and 13 project polarized light beams that oscillate in different directions. By wearing a pair of polarizing glasses in which the right and left glasses selectively transmit polarized light beams different from each other, the viewer's right and left eyes can observe different images. In this way, it is possible to render moving images or the like three-dimensional and hence provide a high level of realism.

Each of the first and second projectors 12 and 13 does not necessarily include a spatial light modulator for each color light beam. Each of the first and second projectors 12 and 13 may include one spatial light modulator that modulates two, three or more color light beams. Further, when a laser light source is used, an image may be displayed by scanning the laser light modulated according to an image signal. The first and second projectors 12 and 13 are not limited to those using a spatial light modulator, but may be slide projectors using slides carrying image information.

The projection system 10 is not necessarily a combination of the first projector 12 and the second projector 13, but may be any combination of the first projector 12, the second projector 13, and an illumination optical system that supplies illumination light. For example, the projection system 10 may include an illumination optical system instead of the second projector 13. The illumination optical system can include any light source, such as a lamp, an LED, and a laser. Such an illumination optical system is suitable, for example, to adjust the wall color according to the purpose for which the projection system 10 is used. Further, a slide projector or a motion picture projector may be used instead of the illumination system.

The projection system 10 may include a plurality of first projectors 12 and/or a plurality of second projectors 13. In such a configuration, an even brighter image can be displayed by superimposing the light beams from a plurality of projectors. Further, by using a plurality of projectors to project polarized light beams that oscillate in different directions, three-dimensional display is possible. The use of a plurality of projectors allows effective representation.

According to the projection system 10 of the invention, bright display can be achieved by using the first and second projectors 12 and 13. By aligning the image produced by the first projector 12 with the image produced by the second projector 13, the brightness can be improved. By superimposing the image produced by the first projector 12 on the image produced by the second projector 13, effective representation is also possible. Examples of such effective representation may be effective color change by assigning different colors to the first and second projectors 12 and 13, an illusion effect, a phantom effect, an overlapping effect, such as fade-in and fade-out, separate projection of the background, character images and the like, and easy addition of character information. The phantom effect may be disabled, for example, by identifying the area of a moving object in a video and displaying the background in black.

Further, the screen of the invention does not necessarily receive light representing an image signal. For example, the screen of the invention, on which light is incident, may be used as a surface illuminator. The screen of the invention may be installed in a region close to a wall or on a wall, or even embedded in a wall. When the screen of the invention is permanently installed, use of the screen as an illuminator when not used for image observation can reduce an unmatched feeling so that the screen matches with the interiors in the room.

As described above, the screen according to the invention is suitable to transmit and reflect light.

The entire disclosure of Japanese Patent Application No. 2007-120563, filed May 1, 2007 is expressly incorporated by reference herein.

What is claimed is:

1. A screen including a first plane and a second plane opposite to the first plane, at least one of which is illuminated with light, the screen comprising:
   a reflective portion that reflects the light incident on the first plane;
   a transmissive portion that transmits the light incident on the second plane toward the first plane; and
   an optical element that focuses the light incident on the second plane such that the focused light is incident on the transmissive portion,
   wherein the reflective portion is inclined to reflect the light incident on the first plane and direct the reflected light in a specific direction.

2. The screen according to claim 1,
   wherein the reflective portion has a shape substantially the same as part of a spheroid.

3. The screen according to claim 1,
   wherein the reflective portion scatters light.

4. The screen according to claim 1,
   wherein the optical element has a curved surface whose curvature radius is substantially the same as R that satisfies the following equation: $R=(n-1)t/n$, where t represents the distance between the first plane and the second plane, and n represents the refractive index of the material that forms the optical element.

5. The screen according to claim 1,
   wherein the optical element has a curved surface whose curvature in the horizontal direction is greater than the curvature in the vertical direction, which is substantially perpendicular to the horizontal direction.

6. The screen according to claim 1, further comprising an angular conversion portion that angularly converts the light incident on the second plane.

7. The screen according to claim 1,
   wherein the transmissive portion scatters light.

8. The screen according to claim 1, further comprising a diffusing portion that diffuses the light that has passed through the transmissive portion in a first direction parallel to the first plane or in the first direction and a second direction parallel to the first plane and substantially perpendicular to the first direction.

9. The screen according to claim 1, further comprising a reflection reducing portion that reduces the reflection of the light incident on the second plane.

10. The screen according to claim 9,
    wherein the reflection reducing portion is disposed on the optical element.

11. The screen according to claim 9,
    wherein the reflection reducing portion includes an absorbing portion that absorbs light, and
    the absorbing portion is disposed on the second plane side of the reflective portion.

12. The screen according to claim 11,
    wherein the absorbing portion is formed on the first plane side of the optical element.

13. A projection system comprising:
    the screen according to claim 1;
    a first projector that projects light onto the first plane of the screen; and
    a second projector that projects light onto the second plane of the screen that is opposite to the first plane.

14. The projection system according to claim 13,
    wherein at least one of the first projector and the second projector is provided in multiple numbers.

15. A screen including a first plane and a second plane opposite to the first plane, at least one of which is illuminated with light, the screen comprising:
- a reflective portion that reflects the light incident on the first plane;
- a transmissive portion that transmits the light incident on the second plane toward the first plane; and
- an optical element that focuses the light incident on the second plane such that the focused light is incident on the transmissive portion,
- wherein the optical element has a curved surface whose curvature radius is substantially the same as R that satisfies the following equation: $R=(n-1)t/n$, where t represents the distance between the first plane and the second plane, and n represents the refractive index of the material that forms the optical element.

16. A screen including a first plane and a second plane opposite to the first plane, at least one of which is illuminated with light, the screen comprising:
- a reflective portion that reflects the light incident on the first plane;
- a transmissive portion that transmits the light incident on the second plane toward the first plane; and
- an optical element that focuses the light incident on the second plane such that the focused light is incident on the transmissive portion,
- wherein the optical element has a curved surface whose curvature in the horizontal direction is greater than the curvature in the vertical direction, which is substantially perpendicular to the horizontal direction.

* * * * *